Nov. 7, 1933.  L. S. FRAPPIER ET AL  1,933,549
PROJECTION MACHINE
Filed Aug. 31, 1928  16 Sheets-Sheet 2
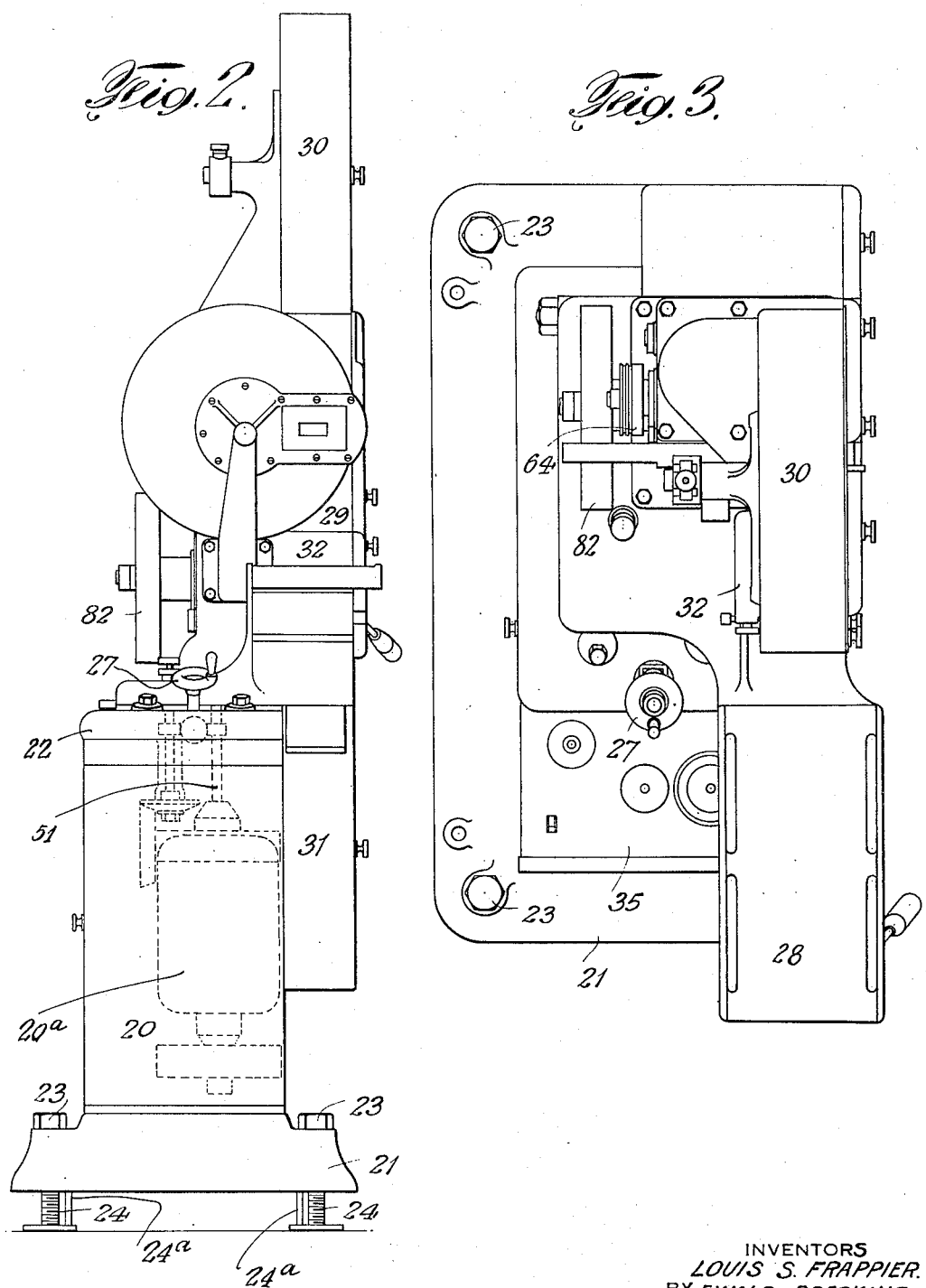
INVENTORS
LOUIS S. FRAPPIER.
BY EWALD BOECKING
Howard
ATTORNEY

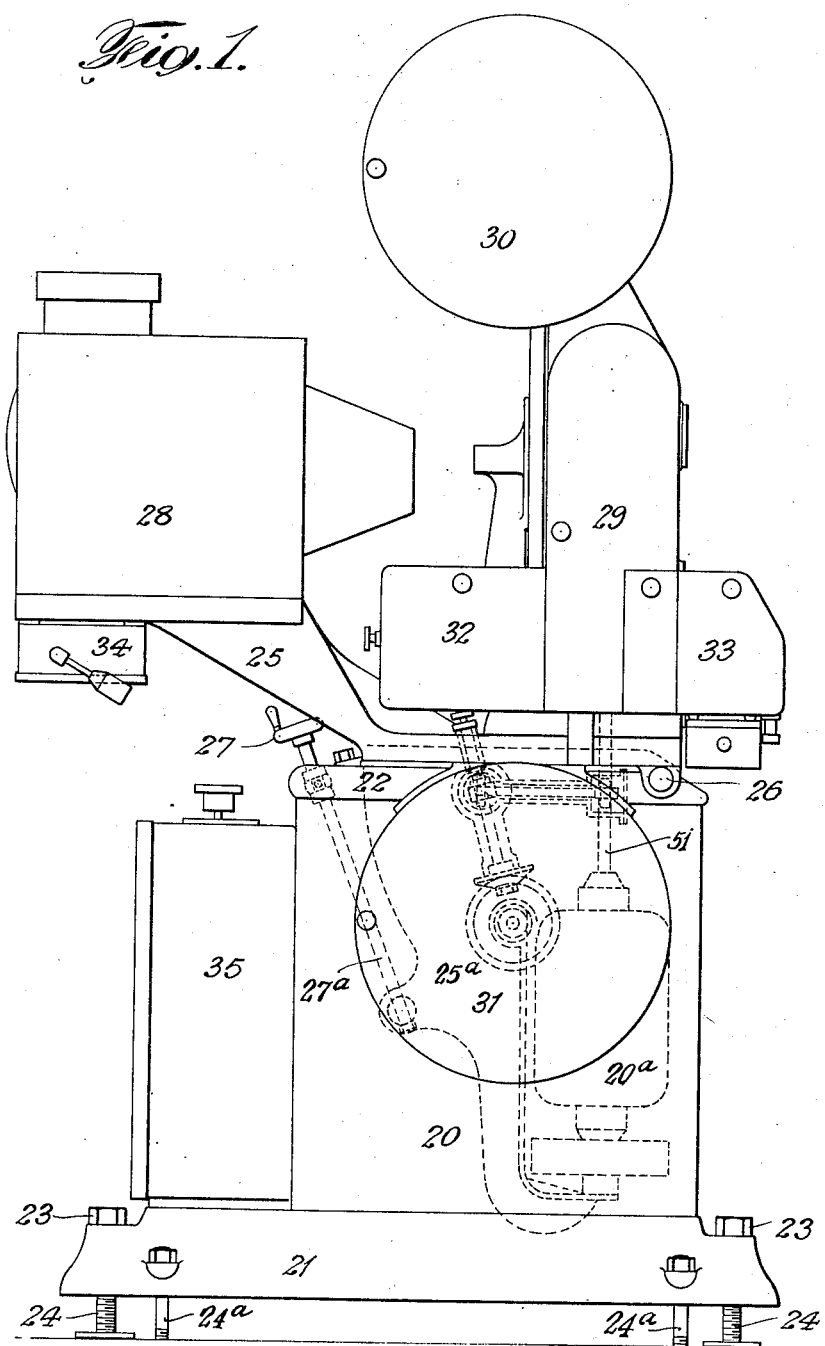

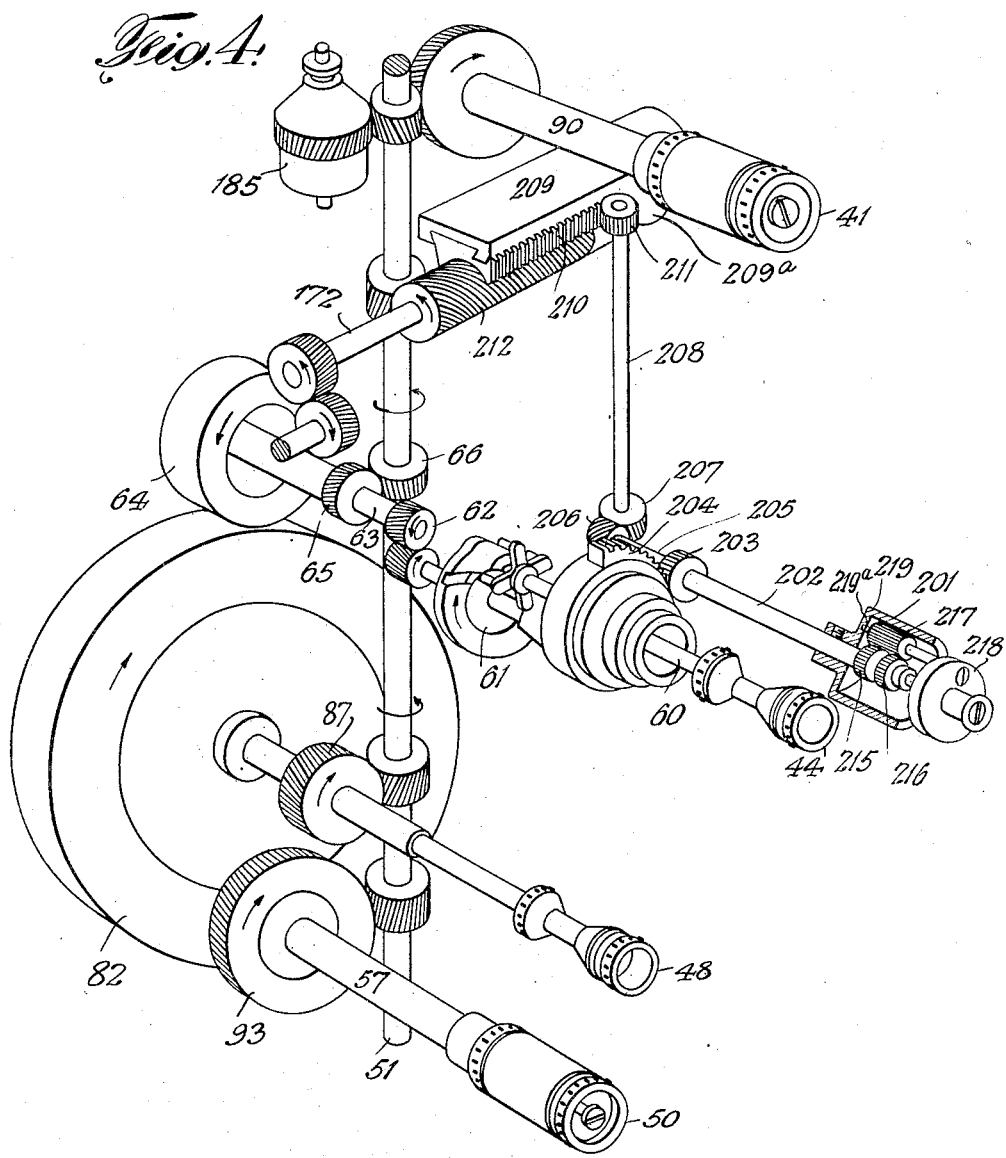

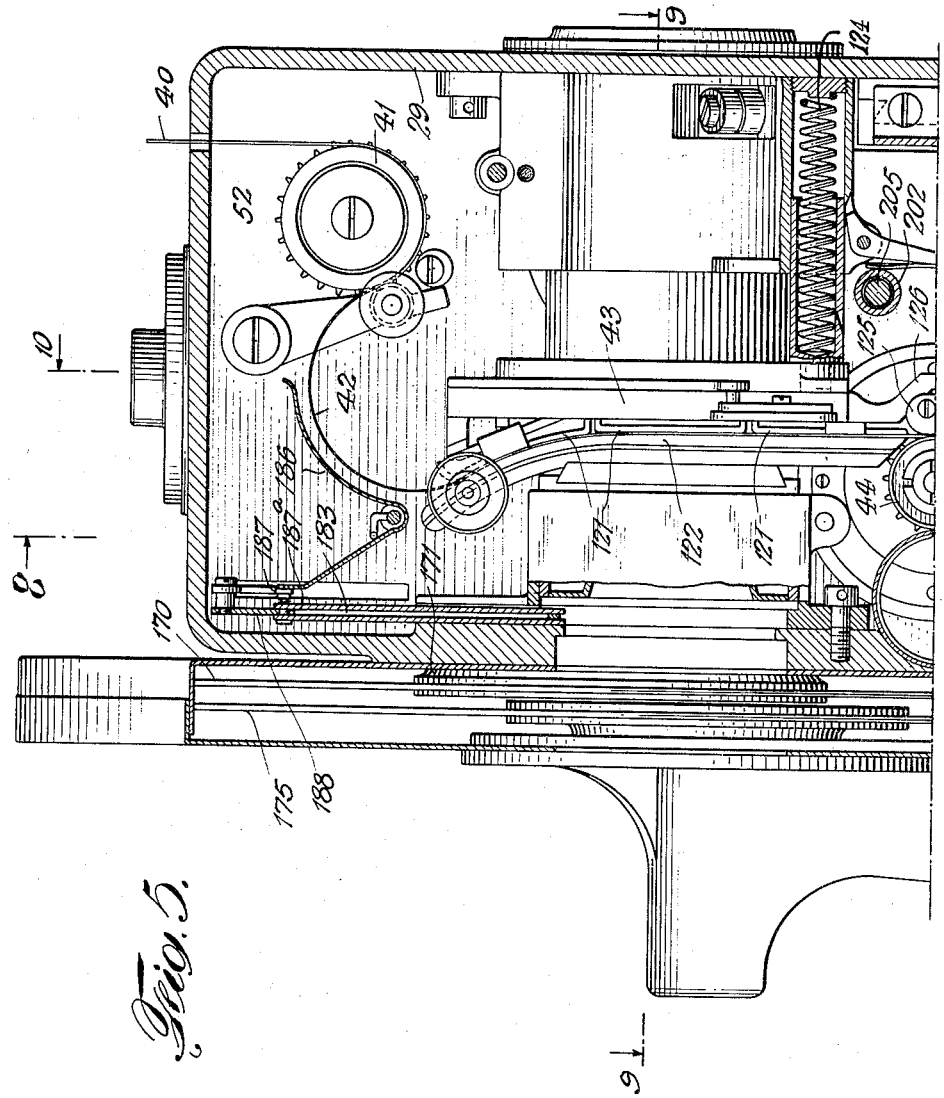

Nov. 7, 1933.     L. S. FRAPPIER ET AL     1,933,549
PROJECTION MACHINE
Filed Aug. 31, 1928     16 Sheets-Sheet 5

INVENTORS
LOUIS S. FRAPPIER.
BY EWALD BOECKING
ATTORNEY

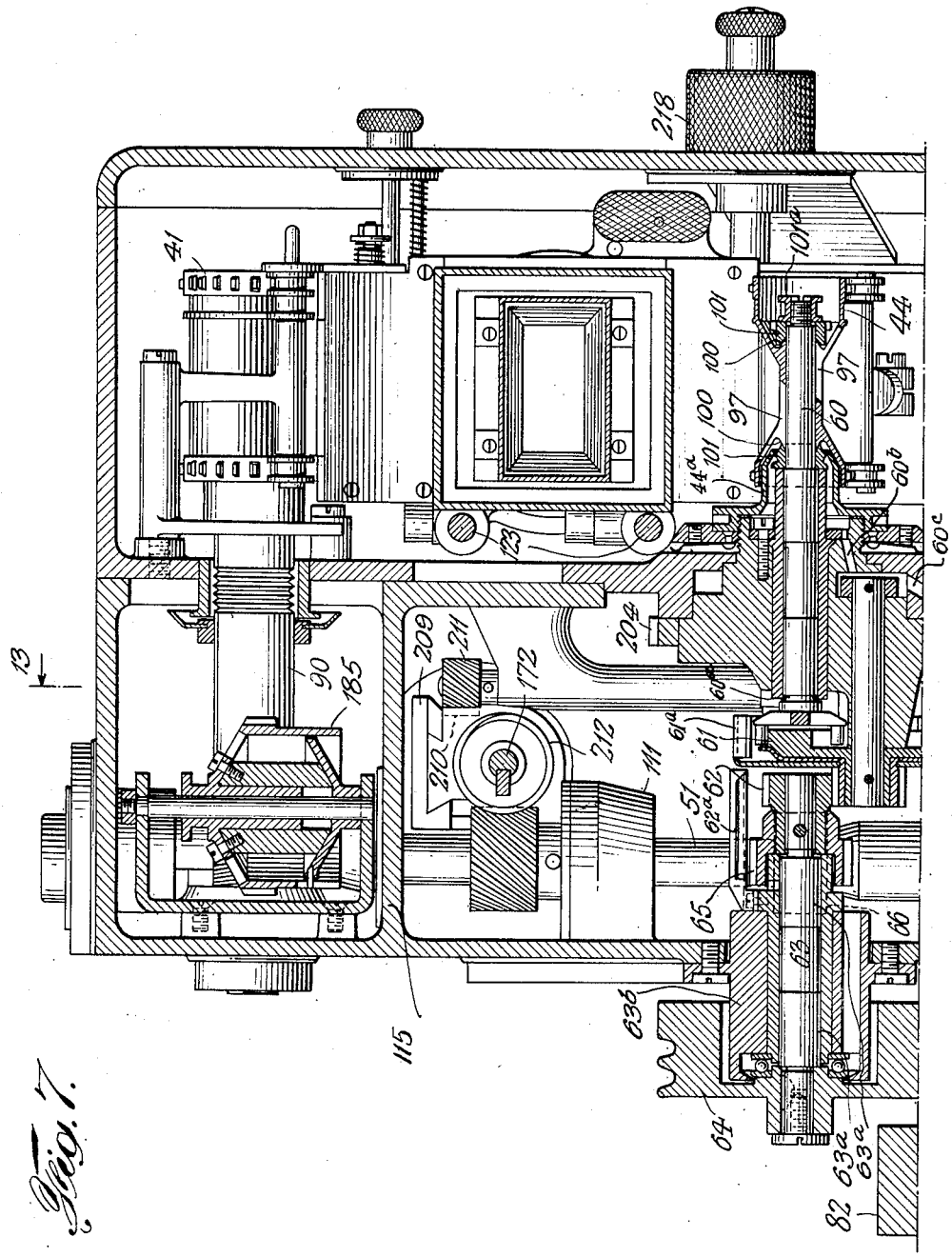

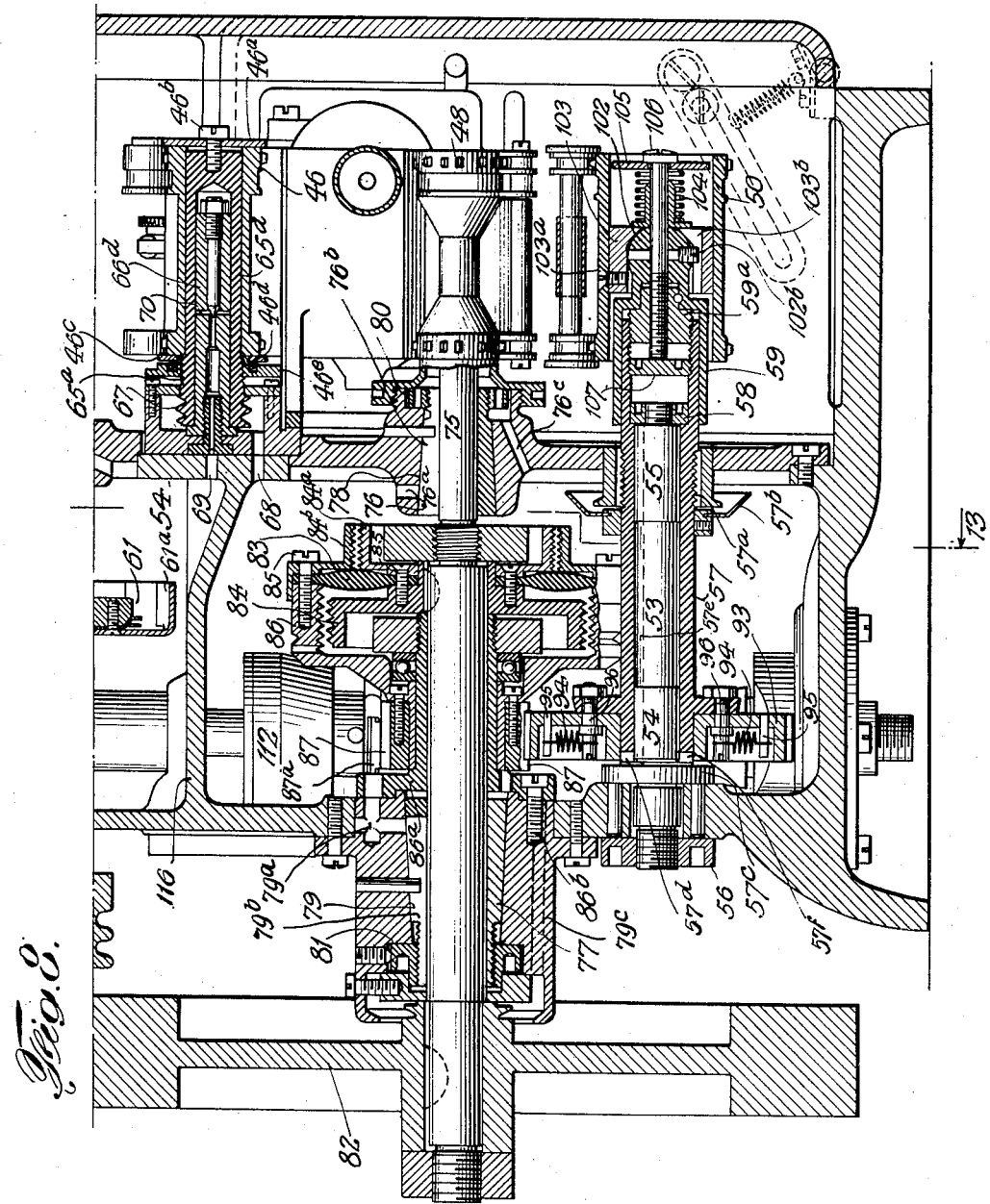

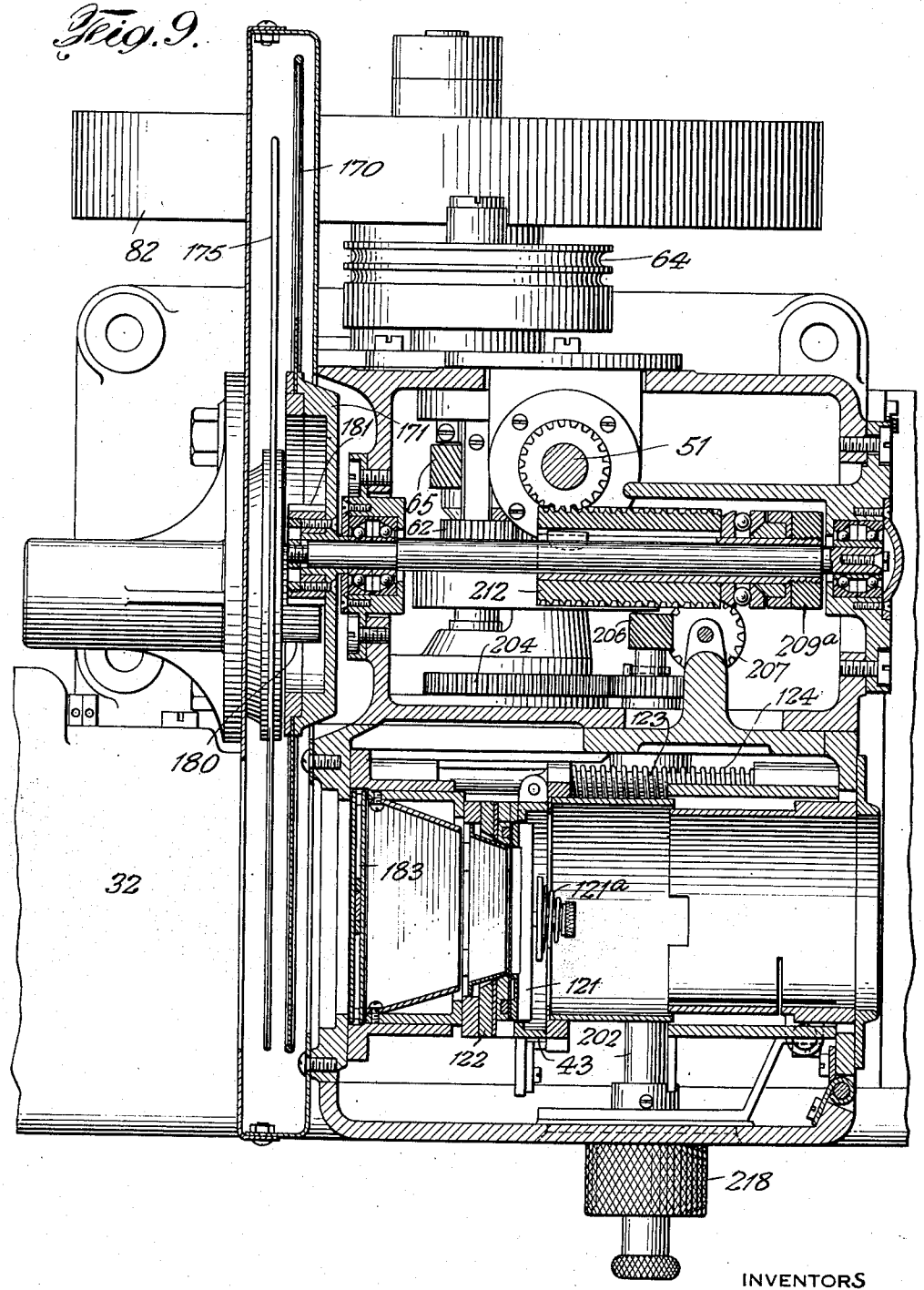

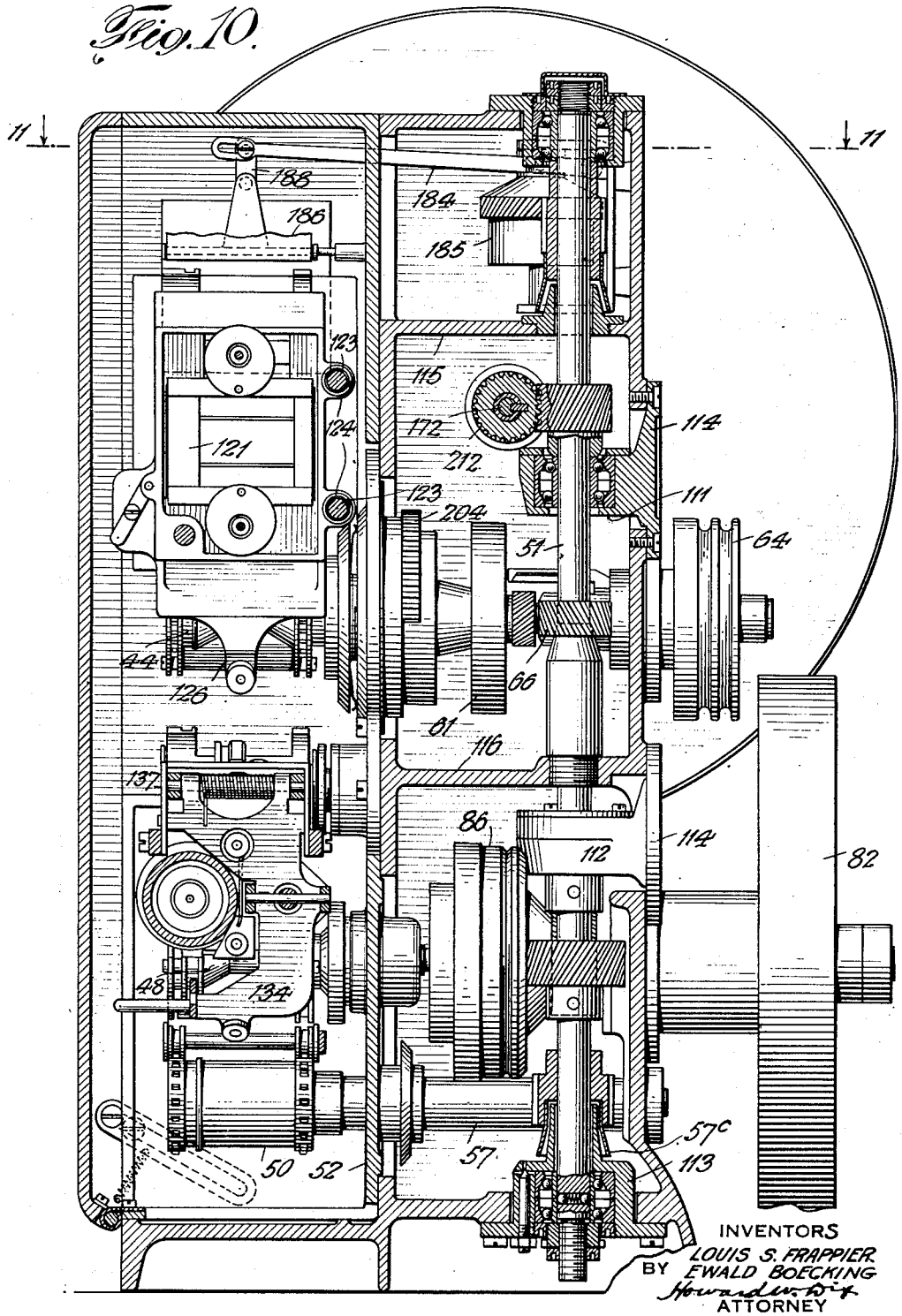

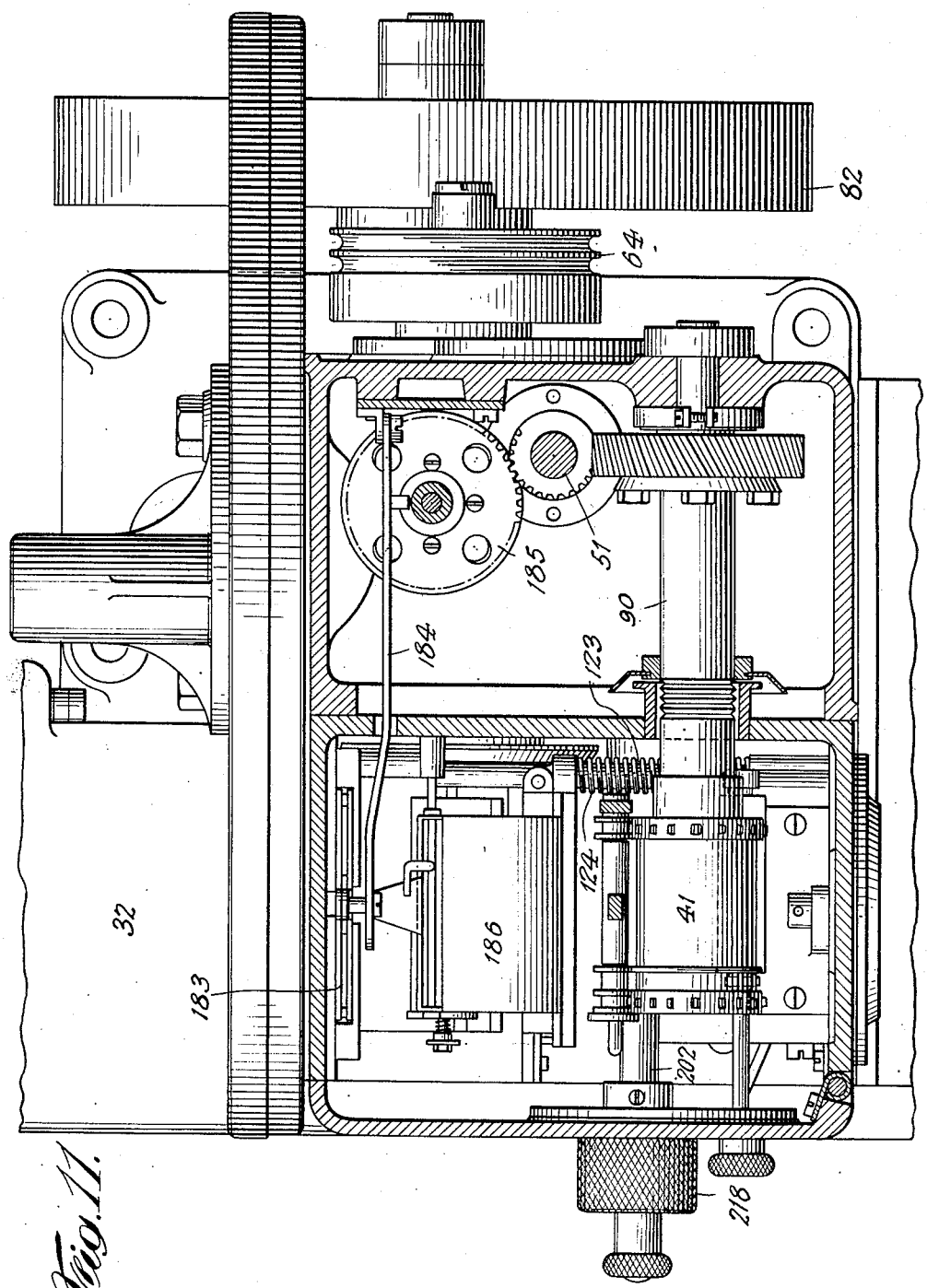

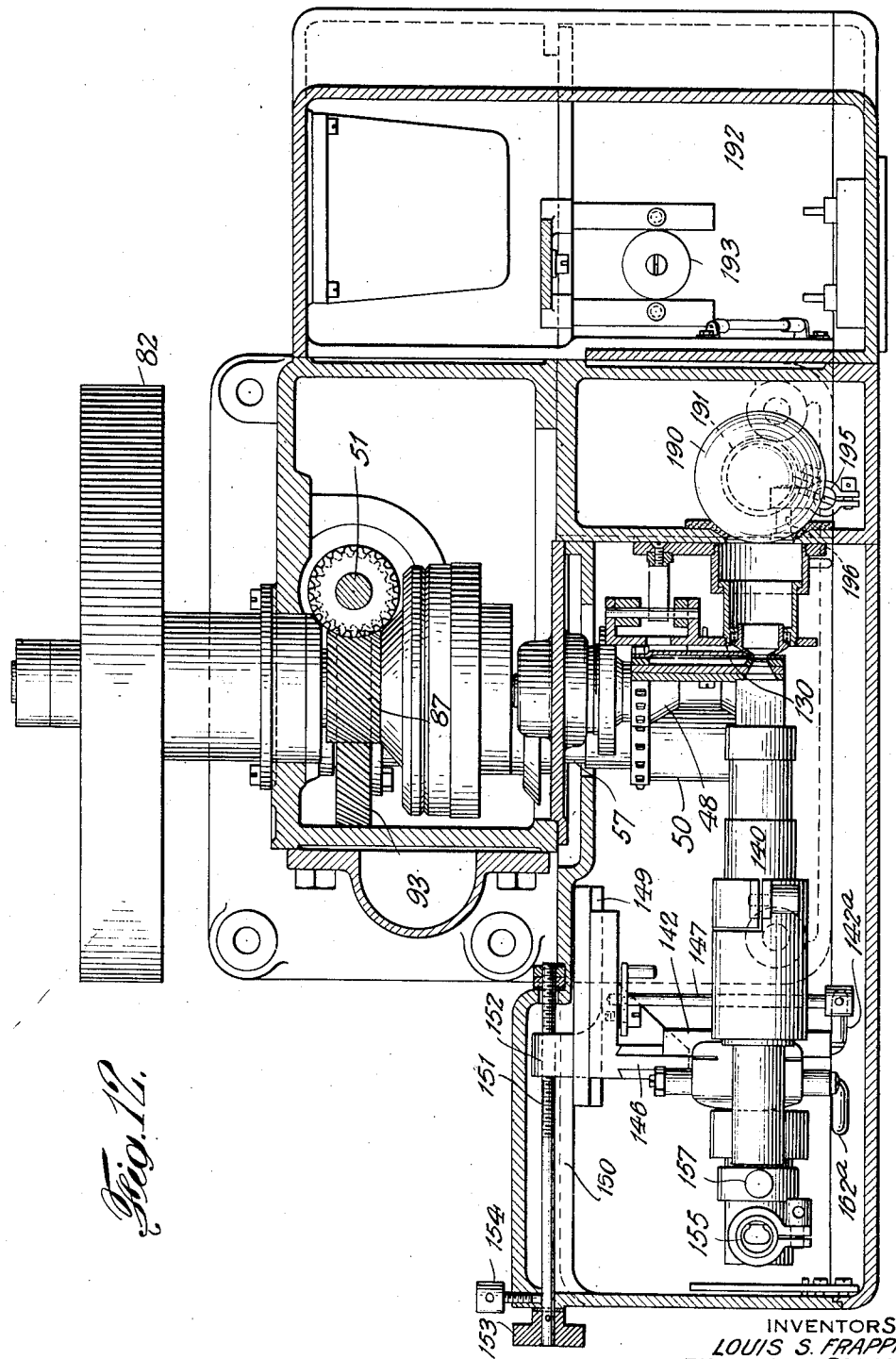

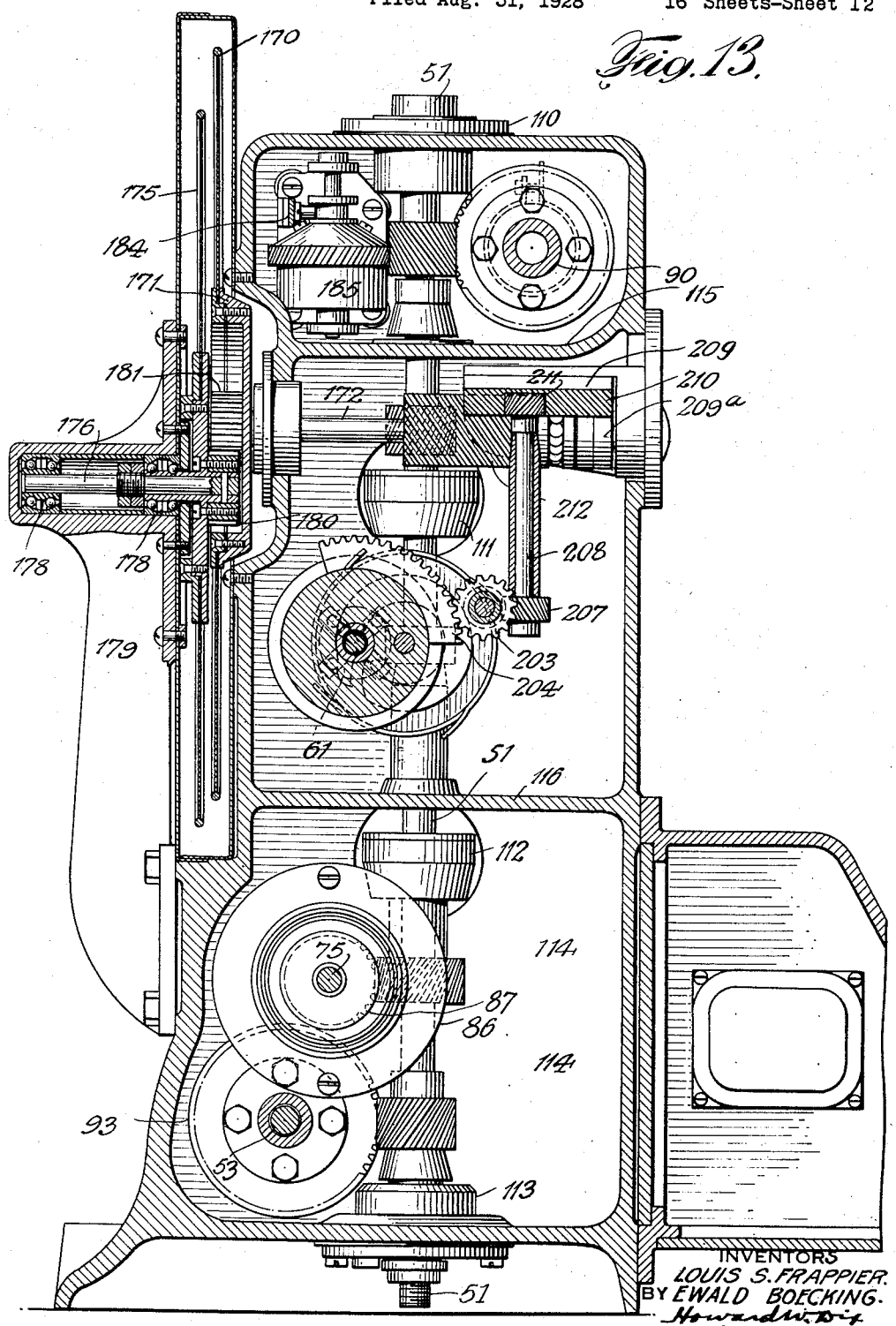

Nov. 7, 1933.　　L. S. FRAPPIER ET AL　　1,933,549
PROJECTION MACHINE
Filed Aug. 31, 1928.　　16 Sheets-Sheet 13

INVENTORS
LOUIS S. FRAPPIER
BY EWALD BOECKING
ATTORNEY

Nov. 7, 1933.  L. S. FRAPPIER ET AL  1,933,549
PROJECTION MACHINE
Filed Aug. 31, 1928   16 Sheets-Sheet 14
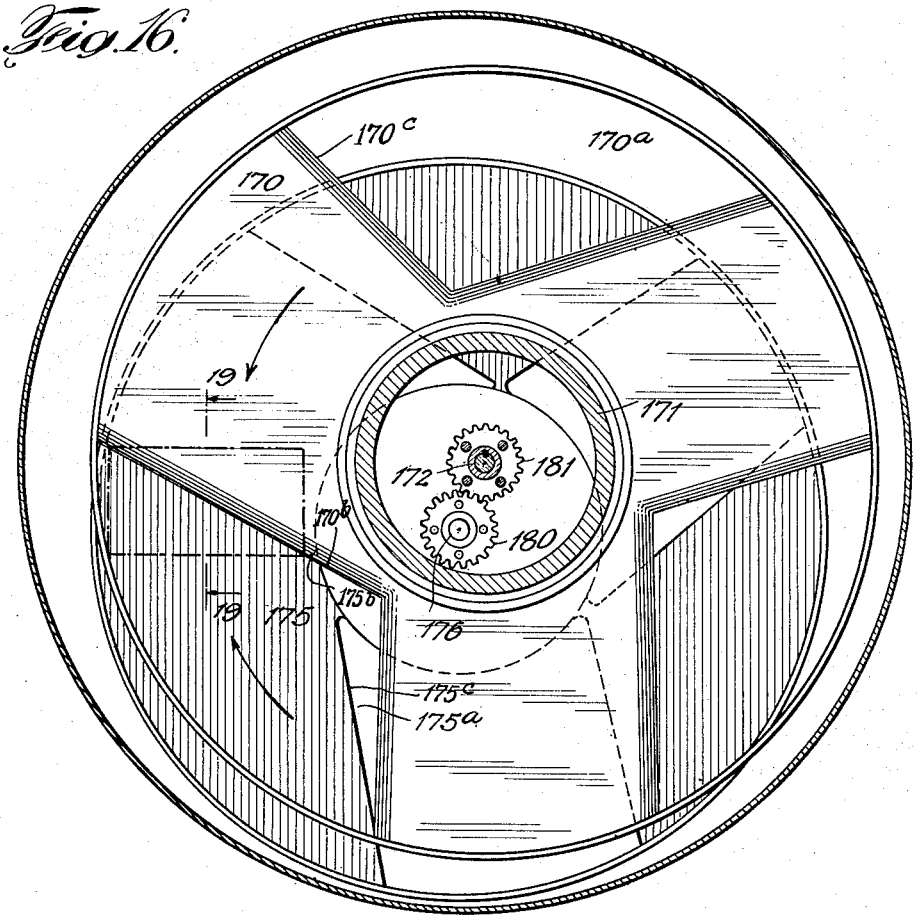
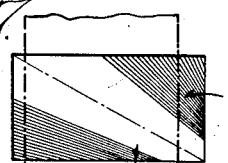
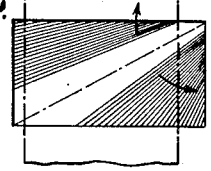
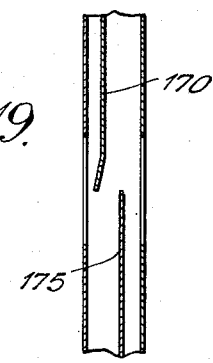
INVENTORS
LOUIS S. FRAPPIER.
BY EWALD BOECKING
ATTORNEY Nov. 7, 1933.    L. S. FRAPPIER ET AL    1,933,549
PROJECTION MACHINE
Filed Aug. 31, 1928    16 Sheets-Sheet 15

INVENTORS
LOUIS S. FRAPPIER.
BY EWALD BOECKING.
ATTORNEY

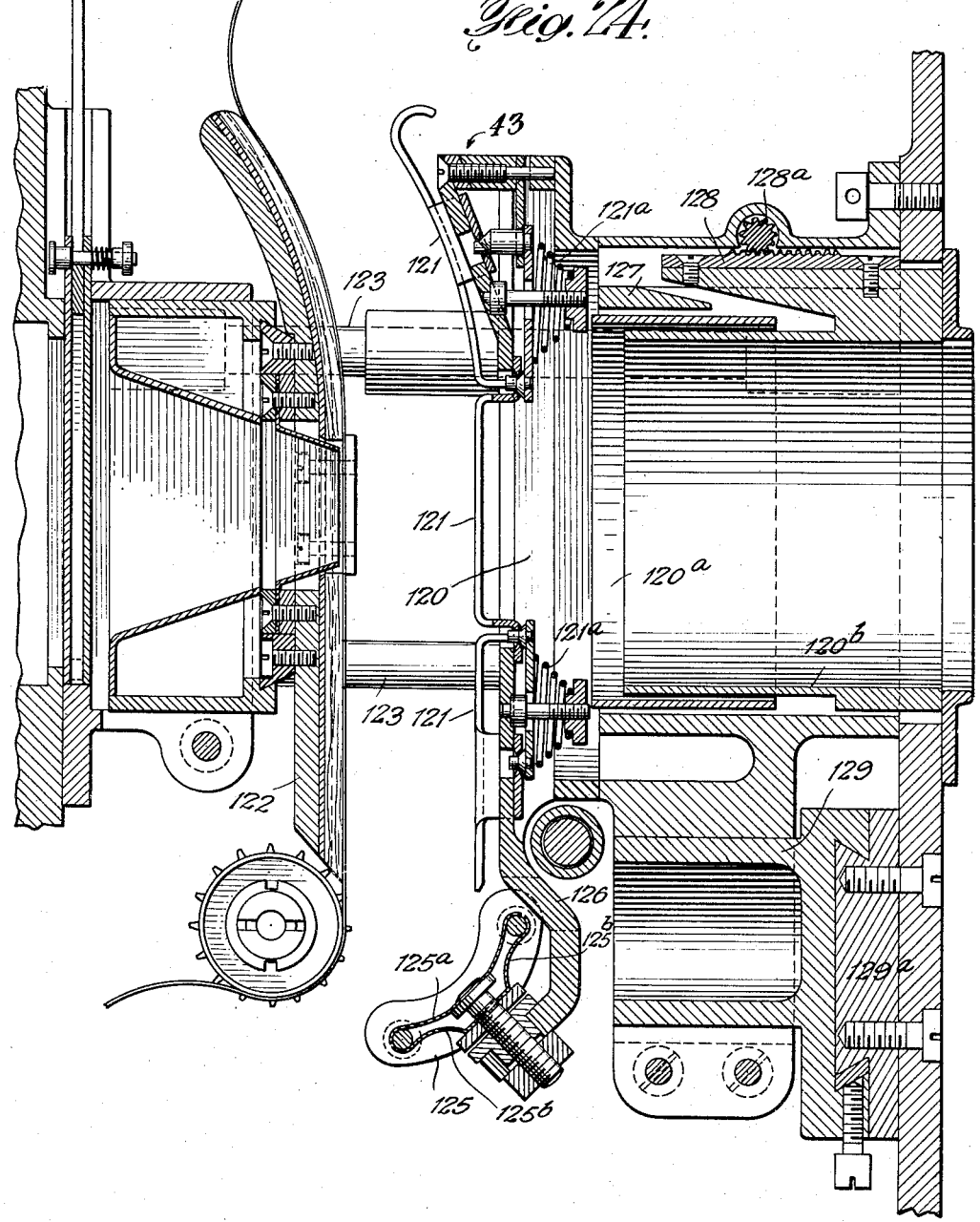

Patented Nov. 7, 1933

1,933,549

UNITED STATES PATENT OFFICE 1,933,549

PROJECTION MACHINE

Louis Simon Frappier and Ewald Boecking, Brooklyn, N. Y., assignors to International Projector Corporation, New York, N. Y., a corporation of Delaware Application August 31, 1928. Serial No. 303,162

12 Claims. (Cl. 88—16.2)

This invention relates to motion picture projection apparatus, and more particularly, to such a machine for projecting a picture upon a screen and simultaneously cooperating in reproducing sound from a synchronized record.

The present invention provides a machine which may be used with a film having both a picture and a sound record registered thereon in operative relationship. The picture is projected upon a screen in the usual manner, and the sound record is translated by a beam of light into a varying electric current from which the sound is reproduced with proper additional apparatus.

An object of the invention is to provide an improved unitary machine capable of reproducing both sound and pictures from a single film.

Another object is to provide a machine capable of using a comparatively wide film having pictures and a sound record thereon.

Another object is to provide a novel machine of the class described in which the various moving parts are completely enclosed whereby interference therewith is prevented and substantially all fire hazards eliminated.

Another object is to provide an improved picture projecting and sound producing machine having a unitary projection head in which the sound record and picture record are automatically synchronized.

Another object is to provide for any picture projecting machine a new and improved shutter mechanism whereby a maximum amount of light is projected through the film.

A further object is to reduce the fire hazard incident to a comparatively large beam of light falling upon a wide film.

A still further object is to provide a machine in which the lubrication system is simplified and in which the oil is prevented from coming in contact with the film.

Still another object is to provide a machine in which the driving mechanism is simplified and in which the usual operating adjustments may be readily accomplished.

The above objects and others, which will be apparent from the following specification taken in connection with the drawings forming a part thereof, are accomplished by providing a unitary projection head containing both the picture aperture plate and the sound aperture plate. The sound telescope is aligned with the latter and adapted to translate the light variations of the film into a varying electric current. A particularly efficient driving means is employed for driving the various sprockets associated with the two aperture plates and for securing the proper timing between the sound record and the picture. The driving is usually accomplished by means of a single vertical shaft which cooperates with the various sprockets and also drives the shutters. The shutters themselves are designed to permit the maximum amount of light to pass with an extremely uniform intensity over the entire surface of the picture. Special mechanism is employed for lubricating the driving gears and for preventing the oil from coming in contact with the film in the film chamber.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a side elevation of a projection machine constructed in accordance with this invention;

Fig. 2 is a rear elevation thereof;

Fig. 3 is a plan view thereof;

Fig. 4 is a diagrammatic showing of the gearing and driving means therefor;

Figure 6:
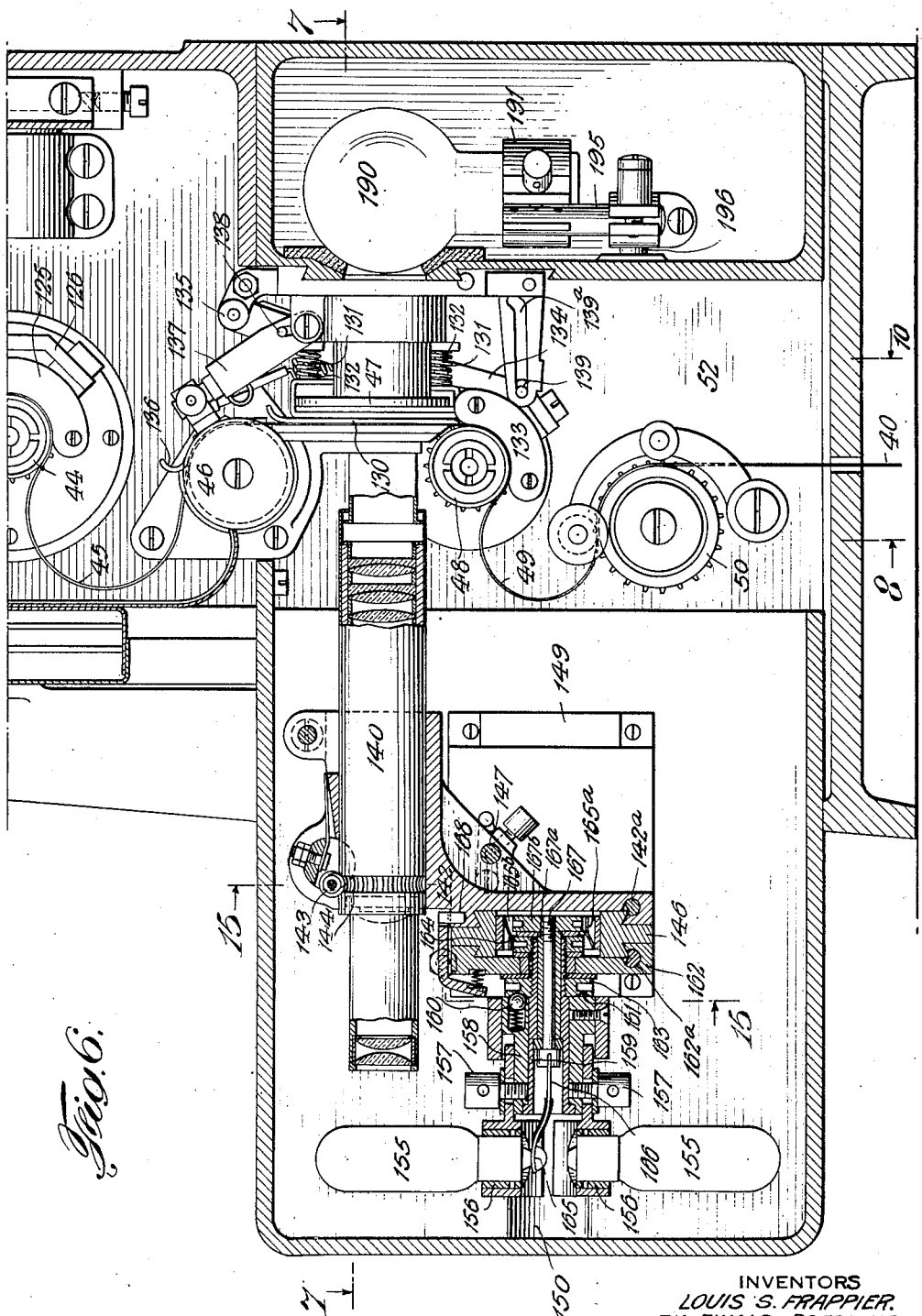
Figure 15:
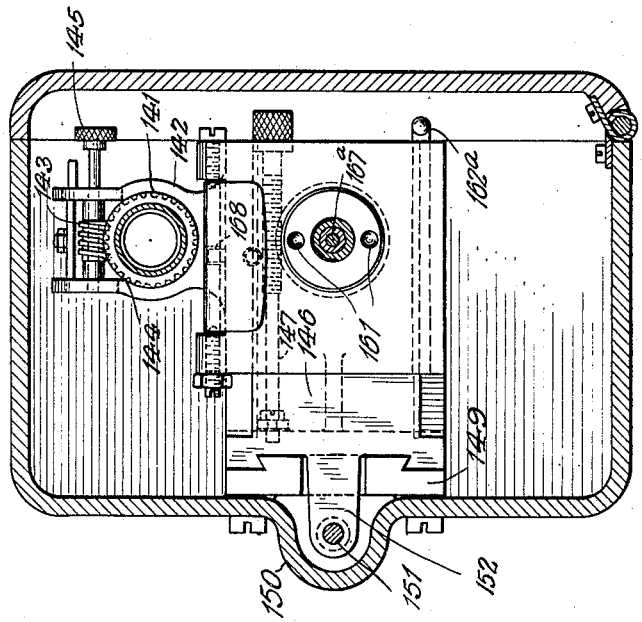
Figure 14:
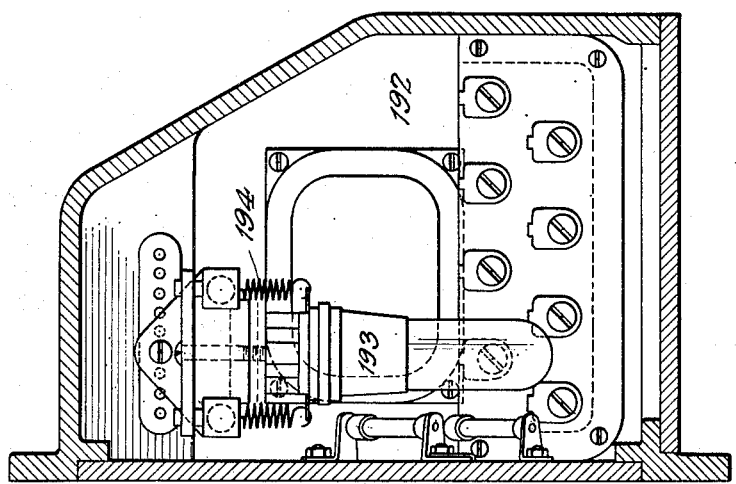

Figs. 5 and 6 constitute a longitudinal section through the projection head showing the arrangement of the film and associated mechanism;

Figs. 7 and 8 constitute a transverse longitudinal section through the projection head showing the various sprockets and driving mechanism;

Fig. 9 is a section taken on the line 9—9 of Fig. 5 showing the shutters and adjusting mechanism;

Fig. 10 is a section taken on the line 10—10 of Figs. 5 and 6 showing the vertical drive shaft and associated gears;

Fig. 11 is a section taken on the line 11—11 of Fig. 10 showing the fire shutter and feed sprocket;

Fig. 12 is a transverse horizontal section showing the sound telescope and adjusting mechanism;

Fig. 13 is a section taken on the line 13—13 of Figs. 7 and 8 showing the mounting of the vertical drive shaft and the shutter mechanism;

Fig. 14 is a sectional view of the amplifying mechanism;

Fig. 15 is a transverse sectional view showing the adjustment mechanism for the sound telescope.

Figure 20:
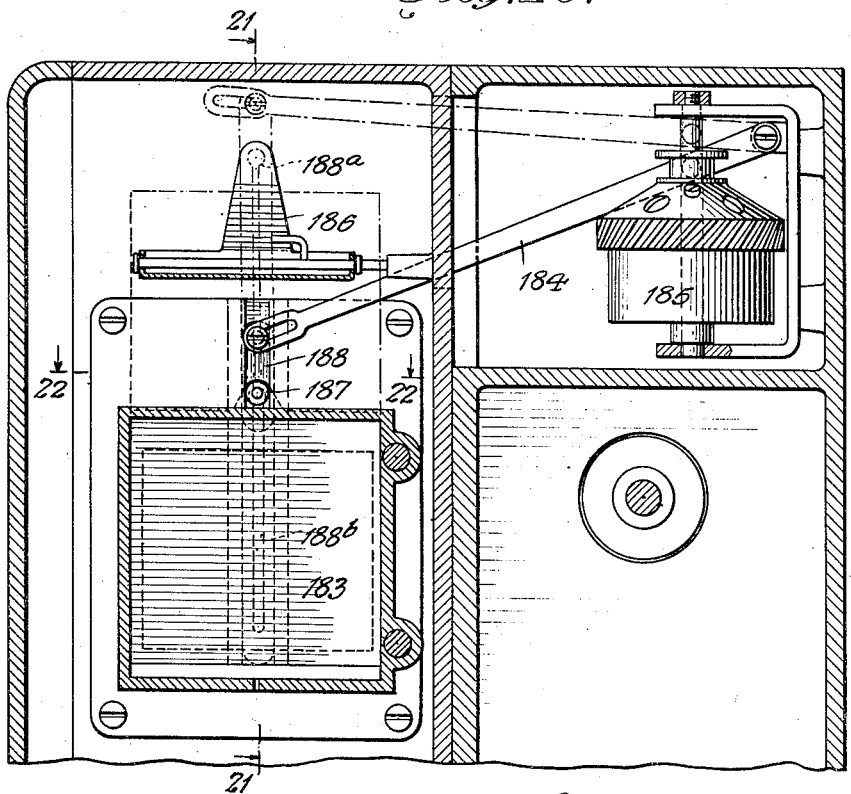
Figure 21:
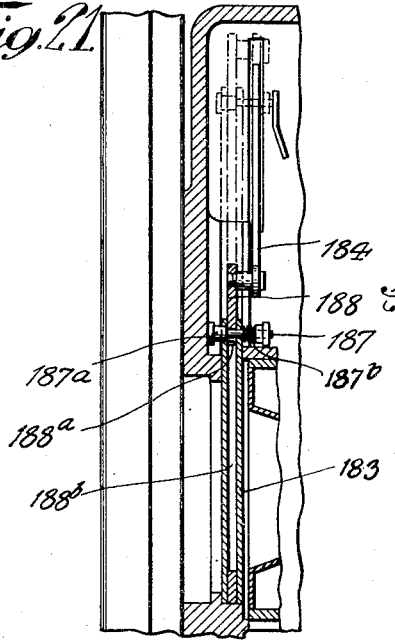
Figure 22:
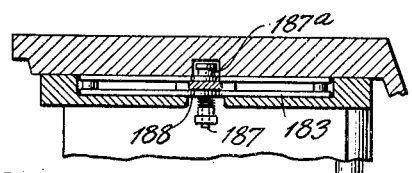
Figure 23:
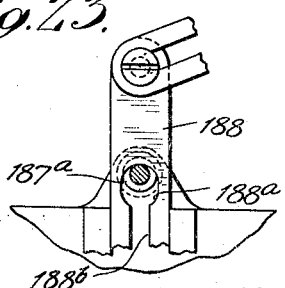

Fig. 16 is a detail view of the shutters;

Fig. 17 is a diagram of the picture aperture with the shutters closing;

Fig. 18 is a diagram of the picture aperture with the shutters opening;

Fig. 19 is a section taken on the line 19—19 of Fig. 16;

Fig. 20 is a detail view of the fire shutter and operating mechanism therefor;

Fig. 21 is a section taken on the line 21—21 of Fig. 20;

Fig. 22 is a section taken on the line 22—22 of Fig. 20;

Fig. 23 is an enlarged detail view of the shutter release mechanism; and

Fig. 24 is a detail view of the picture film gate and lens tube.

Like reference characters denote like parts in the several figures of the drawings.

In the following description and in the claims parts will be identified by specific names for convenience, but they are intended to be as generic in their application to similar parts as the art will permit.

Referring to the drawings more in detail, one type of projection machine embodying the present invention is illustrated as comprising an enclosed pedestal 20 (Figs. 1 and 2) having a base 21 and a top plate 22. Base 21 is provided with threaded bolts 23 extending therethrough and provided with feet 24 which are adapted to contact with the floor or other supporting means. Vertical adjustment and leveling of the machine is accomplished by properly positioning bolts 23 with respect to the base 21. Bolts 24a may be used for securely fastening the base to the floor.

Closed pedestal member 20 is adapted to contain various parts of the apparatus, such as the motor 20a and driving gear and to protect them from injury by accidental contact or otherwise. Pedestal lever 25 is pivoted to the base 22 preferably at its forward end as by bolt 26 and is provided with a flange 25a for supporting motor 20a and the driving gear. Lever 25 is adapted to be adjusted angularly with respect to top plate 22 by means of adjusting wheel 27 through a suitable gearing comprising threaded rod 27a enclosed within pedestal 20 and cooperating with a collar (not shown) attached to flange 25a of lever 25.

Pedestal lever 25 supports a lamp house 28, projection head 29, upper film magazine 30 and lower film magazine 31 in any suitable manner. Sound telescope housing 32 and a suitable covering 33 for the amplifying mechanism are also supported from pedestal lever 25 adjacent the lower end of projection head 29. Suitable switches and control mechanisms 34 and 35 may be supported by the lamp house and by the pedestal in any convenient manner and adapted to control the electrical circuits of the machine in a manner well known in the art.

Referring to Figs. 5 and 6, film 40 is passed through projection head 29 by passing around feed sprocket 41, forming upper loop 42 to film gate 43, which will be hereinafter referred to as the picture film gate, intermittent sprocket 44, intermediate loop 45, idler sprocket 46, film gate 47, which will hereinafter be termed the sound film gate, sound sprocket 48, lower loop 49 and lower feed sprocket 50 to the lower film magazine 31. The various sprockets above mentioned in this preferred construction are driven from a single vertical driving shaft 51 (Figs. 4, 7, 8, 10 and 13) through cooperating worm gears.

Feed sprockets 41 and 50 are of similar construction and are similarly supported from frame 52 (Fig. 10) forming a part of projection head 29. The support for sprocket 50 is shown in detail in Fig. 8 as comprising a shaft 53 having enlarged bearing portions 54 and 55. This shaft is secured in frame 52 preferably by nut 56. An enlarged shoulder portion 57c serves to rigidly secure shaft 53 in its desired position and serves as a stop member for a rotating sleeve 57 which revolves about bearings 54 and 55. Nut 58 threaded on the end of shaft 53 against the shoulder in sleeve 57 prevents longitudinal movement of said sleeve.

Cupped member 59 having a ball end 102 is secured to the end of sleeve 57 in any desired manner as by plug 59a which is pinned to member 59 and is threaded interiorly of said sleeve. Member 103 having a hollow spherical surface in contact with ball 102, is carried within sprocket 50 and secured thereto as by screw 103a. Member 103 is provided with a keyway 103b in which pin 102b is adapted to slide, said pin being threaded or otherwise secured in ball 102. The spherical surface of member 103 is held in contact with ball 102 by means of spring 104 acting between member 103 and washer 105, said washer being secured by bolt 106 and nut 107 to sleeve 57. Sprockets 41 and 50 are thus rotatably secured to sleeves 57 and 90 but are free to pivot axially thereon to compensate for any variation in the direction of feed of the film. Sleeve 57 is provided with oil threads 57a which are adapted to prevent oil from creeping along said sleeve and to return the same to the gear chamber. Said sleeve may also be provided with an oil shield 57b for preventing oil in the mechanism chamber from directly passing around said sleeve into the film chamber.

Sleeve 57 is driven by a flexible driving gear comprising gear wheel 93 meshing with a cooperating gear on shaft 51, said gear 93 being loosely mounted on sleeve 57. Springs 94 interconnecting pegs 95 on gear wheel 93 and pins 96 carried by sleeve 57, serve to impart a driving force from gear wheel 93 to sleeve 57 and sprocket 50. Minor variations in load are thus taken up by the flexible driving means and tearing of the film is prevented.

Intermittent sprocket 44 (Fig. 7) is mounted upon shaft 60 which is rotated by Geneva gear mechanism 61 in a manner well known in the art. Geneva gear mechanism 61 is driven by spur gear 62 which is mounted upon a suitable shaft 63 carrying flywheel 64 upon the opposite end thereof. Shaft 63 is supported in bearings 63a which are carried in a housing 63b secured to frame 52. Driving force is obtained from vertical drive shaft 51 through worm gears 65 and 66 (Fig. 4). Flywheel 64 is sufficiently heavy to absorb minor variations in power and is also adapted to be used as a driving pulley for operating the entire machine in case of failure of power on shaft 51.

Sprocket 44 is split preferably at several points 97 to provide resilience and is firmly secured frictionally to shaft 60 by bevels 100 which are clamped between wedge members 101 by nut 101a.

Idler sprocket 46 (Fig. 8) is supported upon sleeve 65d which is mounted upon a spindle 66d carried by intermediate wall 54. Sleeve 65d is provided with threads 67 which are adapted to prevent oil from reaching sprocket 46 and to return same to the gear or mechanism chamber through passage 68. The sleeve is oiled through passage 69 and oil groove 70. Sprocket 46 is held against threads 65a on sleeve 65d by washer 46a and screw 46b. Washer 46a is slightly larger in diameter than sprocket 46 and serves as a guide for the edge of the film. Washer 46c is resiliently held against the inner end of sprocket 46 by springs 46d and serves as the second film guide. Springs 46d are seated in suitable bores in plate 46e which is secured on threads 65a of sleeve 65d.

Sound sprocket 48 is similar to sprocket 44 and is frictionally secured to shaft 75 (Fig. 8) in the manner described above in connection with sprocket 44. Shaft 75 is journalled in split bearings 76 and 77 having conical surfaces 78 and 79 respectively, which may be adjusted by nuts 80 and 81 respectively to take up wear. Flywheel 82 is mounted upon the free end of rod 75 and is adapted to insure uniform movement of sprocket 48. To enable flywheel 82 to take up minor variations in driving torque, shaft 75 is preferably driven from driving shaft 51 through a flexible coupling comprising washer 83 formed of felt, leather, rubber or other flexible or suitable material and secured between oil shields 84 and 84a by screws 85. Oil shield 84 is keyed or otherwise secured to shaft 75. Washer 83 is also secured to housing 86 which is journalled upon sleeve 86a and adapted to freely rotate thereabout. Housing 86 carries worm gear 87 which meshes with the corresponding gear on shaft 51. Sleeve 86a is secured to frame 52 as by screw 86b and is suitably drilled to permit free rotation of shaft 75 therein. Oil shield 84b is secured to housing 86 in position to cooperate with oil shield 84a for preventing oil from contacting with washer 83. Housing 86 and oil shields 84, 84a and 84b are all provided with suitable threads for discharging oil away from washer 83.

Vertical shaft 51 (Figs. 10 and 13) is preferably supported in four bearings 110, 111, 112 and 113, which are supported in side plate 114 on projection head 29. The gear or mechanism chamber is preferably divided by members 115 and 116 into different vertical compartments for oiling purposes (Figs. 7 and 8). The bearings may preferably be lubricated by placing a small amount of oil in each of said chambers and allowing the same to be carried by the various cooperating gears to all parts thereof.

For example, in the lower chamber oil is picked up by gear 93 and carried to gear 87 and the cooperating gear on shaft 51. Oil is also thrown by gear 87 into a receptacle 87a which feeds the front bearing 76 of shaft 75 through a pipe (not shown) leading to hole 76a in the housing. This hole carries oil to groove 76b in bearing 76. Excess oil is returned through hole 76c to the gear chamber. Receptacle 87a also directs oil through passage 79a to groove 79b in bearing 77, excess oil passing through hole 79c into the gear chamber. Oil carried by gear 93 also falls through hole 57d to groove 57e in shaft 53 thereby oiling bearings 54 and 55. Excess oil is blocked by nut 107 returning along shaft 53 and is discharged through hole 57f in sleeve 57.

In the second gear chamber oil is splashed by fins 61a of Geneva gear 61 to the various gears and through opening 60a to shaft 60. Excess oil is prevented by shield 44a from reaching the film and returning through passages 60b and 60c to the gear chamber. Oil is also thrown into trough 62a and carried through a passage (not shown) to the bearings of shaft 63. The gears in the upper chamber are similarly oiled by dipping into a bath contained therein.

Picture film gate 43 (Figs. 5 and 24) comprises a base member 120 and various contacting strips 121 which are held in resilient contact with film 40, by springs 121a. The upper portion of aperture plate 122 is curved adjacent upper loop 42 of film 40 to allow the film to naturally contact with the surface thereof. Plate 120 is slidably mounted upon rods 123 and is normally held in film engaging relationship by spring 124. Pressure member 125, adapted to hold the film in contact with sprocket 44, is mounted upon arm 126 which is secured to sliding plate 120 of film gate 43. Member 125 comprises contacting segment 125a (Fig. 24) and spring members 125b by means of which it is held in engagement with the film on sprocket 44. The entire contacting surface including strips or pads 121 and segment 125a is moved horizontally on rods 123 in a direction parallel to itself to release the film and to permit the same to be inserted in or removed from the machine. Light shield 120a is secured to base member 120 and is adapted to telescope over lens tube 120b. The lens tube is slidably supported from housing 127 and may be longitudinally adjusted by rack 128 and pinion 128a. Housing 127 is carried on pin 129 which is held in bracket 129a, dovetailed therein, thereby permitting easy removal of the whole mechanism at any time.

Sound film gate 47 comprises a flat pressure member 130 mounted upon rods 131 and held in engagement with film 40 by springs 132. Shoe 133 which contacts with sound sprocket 48 is mounted upon rod 134 which is pivoted to the frame of the machine as by a support 135. Pressure shoe 136 is also pivotally mounted to the frame of the machine as by rod 137. Pin 138 secured to rod 134 cooperated with a slot in rod 137 whereby movement of rod 134 causes a corresponding movement of rod 137. Rod 134 is also connected to plate 130 by a suitable yoke (not shown) whereby pivotal movement of rod 134 causes disengagement of shoe 133, pivotal movement of rod 137, disengagement of shoe 136 and longitudinal movement of plate 130, thereby completely releasing the film. Pin 139 slides in slot 139a and provides a handle for operating the film gate and also a detent means.

Sound telescope 140 is mounted in a suitable bearing 141 (Figs. 6, 12 and 15) in slidable frame 142. Telescope 140 may be rotatably adjusted in said bearing by worm 143 and corresponding gear 144, thumb nut 145 being provided for making the adjustment. Frame 142 is slidably supported on bracket 146 and may be moved transversely thereof for purposes of adjustment. Threaded rod 147 is secured to bracket 146 and threaded in frame 142 for controlling the position thereof. Bracket 146 is slidably mounted on tongue 149 which is secured to framework 150 on the machine and is adapted to be moved longitudinally thereof as by threaded rod 151 (Figs. 12 and 15) contacting with a threaded extension 152 on said bracket. Thumb screw 153 may be employed for turning rod 151 and may be secured in adjusted position by means of lock screw 154.

The telescope may thus be adjusted rotatably longitudinally and transversely by simple operations. Vertical adjustment is obtained by varying the position of tongue 149 on framework 150.

Suitable lamps 155 are mounted in sockets 156 which are rotatably mounted in cooperating relationship with telescope 140. Sockets 156 are secured by screws 157 to sleeve 158 which is rotatable about bushing 159. Spring pressed detents 160 cooperating with grooves 161 secure sleeve 159 in its desired position. Bushing 159 is secured to slidable member 162 by nuts 163 and 164 which are threaded thereon. Contact strip 165 is adapted to make contact with the base of lamp 155 in socket 156 and is externally connected as by wire 166 to stationary rod 167 which passes through insulating bushing 167a and terminates in round nut 167b. Contact strips 165a and 165b make electrical contact with nuts 167b and 164 respectively and are connected to the external circuit (not shown) for supplying lamp 155. Slidable member 162 is normally locked to member 142 by means of spring pressed detent 168. The entire lamp frame may therefore be removed by releasing said detent and sliding the frame transversely of the bracket 146. Members 162 and 142 may be secured to bracket 146 by grooved rods 162a and 142a respectively.

Lamps 155 may be selectively brought into operative position by rotating the supporting framework 180°. This permits a burned out lamp to be immediately replaced in the machine without interrupting the operation thereof. The relationship of the lamp sockets and the sound telescope 140 is adjusted at the factory. Since there are no moving parts no further adjustment should be necessary. Telescope 140 is, however, rotatably adjusted as by means of worm gear 144 and may be adjusted longitudinally and transversely with respect to film 40 by means of threaded rods 151 and 147.

Shutter 170 (Fig. 13) is mounted upon cup shaped member 171 which is secured to shaft 172. This shaft 172 is driven from vertical drive shaft 51 by means of cooperating worm gears. Shutter 175 is mounted upon shaft 176 supported by bearings 178 which are positioned in framework 179 of the machine. Said shutter is rotated by spur gear 180 cooperating with similar spur gear 181 which is mounted upon shaft 172 and carried interiorly of cup shaped member 171. The two shutters 170 and 175 are consequently revolved in opposite directions and at identical speeds. Shutters 170 and 175 are provided with a plurality of apertures 170a and 175a (Fig. 16) respectively which are so shaped that closing of the apertures occurs on one diagonal (Fig. 17) and opening occurs on the other diagonal (Fig. 18). One edge of shutter 170 may be bent (Fig. 19) to form a fan for cooling purposes if desired.

Referring to Fig. 16 shutter 175 is shown as revolving in a clockwise direction and shutter 170 in a counter-clockwise direction. Leading edges 170b and 175b of the shutters have met, completely closing the light apertures along a diagonal. Upon further rotation, trailing edges 170c and 175c of the shutters will separate along the opposite diagonal of the apertures, as shown in Fig. 18. The light will consequently be more evenly distributed over the film and dark areas at the edges largely eliminated.

Fire shutter 183 (Figs. 5, 10 and 20 to 23) is slidably secured between shutters 175 and 170 and the film gate 43. This shutter is adapted to perform its usual functions and cut off the projection light from the film when for any reason the film becomes stationary. For this purpose fire gate 183 is mounted upon rod 188 which is pinned to pivoted rod 184 (Figs. 11 and 20). Rod 184 is adapted to be actuated by governor 185 (Fig. 13) which is driven from vertical drive shaft 51. The relationship of the parts is such that fire shutter 183 is held by the governor in a raised position when the machine is operating at a normal speed. Governor 185, however, is so adjusted that when the machine operated at a speed below normal, rod 184 falls to the position shown in Fig. 20 and the shutter is allowed to fall and cut off the light from the film 40.

In order to cause the fire shutter to operate when the film breaks, a fire shutter release 186 (Fig. 5) is pivotally mounted in the framework of the machine adjacent the upper film loop 42 in a position to be operated thereby should the loop suddenly enlarge. Spring pressed detent 187, passing through fire shutter 183 and supporting rod 188 (Fig. 21) is adapted to contact with the release 186. This detent 187 is provided with an enlarged portion 187a which is normally held by spring 187b in a suitable hole 188a in rod 188. The shank of pin 187 is sufficiently small to slide in slot 188b in rod 188 and will allow the shutter 183 to move relatively to said rod. Normally the enlarged portion 187a of pin 187 is engaged in hole 188a and the shutter is secured in raised position. In case film 40 should break, however, continued operation of the machine will cause loop 42 to contact with fire shutter release 186 whereby the latter exerts pressure upon pin 187, forcing enlarged portion 187a from hole 188a and allowing pin 187 to slide in slot 188b whereby fire shutter 183 automatically falls in the path of the projection light. When the machine is subsequently stopped, arm 184 becomes depressed again bringing hole 188a in line with the detent. Spring 187b then forces enlarged portion 187a into hole 188a, again securing the shutter to rod 188 whereby restarting the machine will automatically raise the shutter. The shutter is therefore actuated either by a stopping of the machine or by a breaking of the film and in either case will be raised when the machine again reaches operating speed.

Photoelectric cell 190 (Fig. 6) is mounted in a suitable socket 191 in a position to receive light which has been focused upon film 40 by sound telescope 140 and has passed through said film. Socket 191 is clamped upon rod 195 which is secured to peg 196, attached to the frame of the projection head. Photoelectric cell 190 is adapted to translate variations in light intensity into variations in current which are amplified by amplifier mechanism 192 (Fig. 14) and may be utilized for operating the sound reproducing mechanism. Amplifier mechanism 192 comprises an amplifying space discharge device 193 which is preferably supported from springs 194 in order to prevent any vibration of the machine from interfering with the operation thereof.

The framing is accomplished by means of control 201 (Fig. 4) which simultaneously operates the Geneva gear and shaft 172, driving the shutters. The mechanism preferably comprises a tubular rod 202 having a spur gear 203 affixed thereto which operates with a rack 204 formed on the casing of the Geneva gear. An internal rod 205 is journalled in rod 202 and carries gear 206 cooperating with a gear 207 on shaft 208. Shaft 208 operates housing 209 by means of rack 210 and pinion 211. Housing 209 (Figs. 4, 9 and 13) includes ear 209a which passes around shaft 172 and forms a thrust bearing for spiral gear 212 which meshes with a corresponding gear on shaft 51. The direction of rotation is such that gear 212 is held against the thrust bearing during normal operation of the machine. Gear 212 is slidably keyed to shaft 172 which drives shutters 170 and 175. Longitudinal movement of gear 212 on shaft 172 varies the relationship of said shaft with respect to its cooperating gear on shaft 51 and consequently alters the angular position of the shutters.

A differential movement is obtained between shafts 202 and 205 by means of gears 215, 216 and 217, (Fig. 4). Gears 215 and 216 may differ in size by a small amount, such as one tooth. Gear 217 is carried by hand wheel 218 which is loosely mounted with respect to shaft 205, but is removably secured to housing 219 by pin 219a. Housing 219 is firmly secured to shaft 202 and rotates therewith. Movement of housing 219 also causes movement of wheel 218 although wheel 218 can be moved independently of the housing when pin 219a is disengaged. The shutter is adjusted by disengaging pin 219a and turning wheel 218. Gear 215 tends to remain stationary while gear 217 rotates thereabout and causes a differential movement of gear 216, thereby permitting a minute adjustment of the shutter device. Framing is accomplished by housing 219. This turns the Geneva gear directly. At the same time gear 217 locks gears 215 and 216 and causes a corresponding movement of shaft 205 and the shutter adjusting mechanism.

A machine constructed in accordance with the present invention preferably provides for the use of a wide film, a portion of which is set apart for the picture and another portion of which is utilized for the sound record. The sound record usually comprises a strip on one side of the film capable of transmitting light of varying intensity, the variations corresponding to the sound waves which are to be reproduced. These are translated by means of a beam of light acting upon a photo-electric cell into a varying electric current which is utilized for the operation of the speaking device.

The use of a wide film renders the alignment of various parts extremely important in order to avoid tearing, hence the two feed sprockets which feed the film from the upper film magazine to the lower film magazine respectively are formed with a self-aligning feature whereby they are capable of taking up any minor variations in alignment.

The two shutters above described which rotate in opposite directions are each provided with solid and apertured portions in the usual manner. The shutters are so designed, however, that their line of cut-off of the light rays takes place along one diagonal of the film and the opening occurs along the other diagonal, with the result that the corners only appear slightly darker, whereas the entire center portion of the picture is of substantially uniform intensity. Furthermore, by positioning the shutter between the film and the source of light, heat is prevented from being applied to the film when the shutters are not in open position. The heat is thus applied over only a small portion of the total time, with a consequent reduction in fire hazard. The fire hazard is further reduced by the novel fire shutter which is adapted to drop either when the film breaks, causing the upper film loop to enlarge, or when the machine falls below its normal speed of operation.

In threading the film through the machine, the picture film gate and the sound film gate are released and the film is passed over the sprockets in the sequence pointed out above, and over the two aperture plates. The film gates are then closed, pressing the film firmly against the aperture plates.

The intermediate loop compensates for the difference in drive between the intermittent sprocket and the uniformly rotating sprocket. It must be of the proper size to synchronize the sound and picture, taking into account the displacement of the two telescopes. The sound sprocket, as pointed out, is provided with a resilient drive to take up minor variations which would distort the sound, and to insure an even travel of the film over the sound aperture.

The projection light is passed through the projection aperture, which is located at one side of the film for projecting pictures on the screen. The light from the sound telescope is displaced to the opposite side of the film in a position to cooperate with the sound record which is positioned thereon. The sound telescope may be accurately adjusted by the means above pointed out to bring it into proper alignment both with the sound record and with the light source 155. Photo-electric cell 190 may be properly positioned at the factory and thereafter should not require adjustment.

By dividing the gear chambers into three vertically aligned sections, lubrication of the apparatus is simplified enabling the oil to be properly carried to all of the cooperating gears and to be completely shut out from the film chamber. The various oil shields and threaded rods prevent any oil from creeping along the rods into the film chamber or from passing through the apertures between that chamber and the gear chamber.

By providing four bearings for the vertical drive shaft, a rigid assembly is secured, and proper alignment of the various parts may be maintained. The single drive shaft drives the four sprockets, the shutters and the governor for the fire shutter, thereby facilitating the timing of the various parts.

In the drawings accompanying and forming part of this specification, a practical commercial embodiment of the invention is shown, but as such illustration is primarily for purposes of disclosure, it will be understood that the structure may be modified in various respects without departure from the broad spirit and scope of the invention as hereinafter defined and claimed.

What is claimed is:

1. In a projection head having a picture aperture and a sound aperture, a feed sprocket adapted to receive a film from a film magazine, an intermittent sprocket adapted to pass said film over said picture aperture, a continuous sound sprocket adapted to pass said film over said sound aperture, a second feed sprocket adapted to feed said film to said lower film magazine, means for threading a film over said sprockets and forming upper, lower and intermediate loops to permit variations in speed of travel, and a single means for driving said sprockets.

2. In a projection head having a picture aperture and a sound aperture, a feed sprocket adapted to receive a film from a film magazine, an intermittent sprocket adapted to pass said film over said picture aperture, a continuous sound sprocket adapted to pass said film over said sound aperture, a second feed sprocket adapted to feed said film to a lower film magazine, and means for mounting said feed sprockets to permit a slight angular variation of their axes of rotation whereby a wide film may be utilized without tearing during minor variations in the line of travel thereof.

3. In a projection head for a machine of the class described having a picture aperture and a sound aperture, means for threading a film through said projection head to form an upper loop above said picture aperture, an intermediate loop between said picture aperture and said sound aperture, and a lower loop below said sound aperture whereby variations in drive may be compensated for.

4. In a projection head having a picture aperture and a sound aperture, a feed sprocket adapted to receive a film from a film magazine, an intermittent sprocket adapted to pass said film over said picture aperture, a continuous sound sprocket adapted to pass said film over said sound aperture, a second feed sprocket adapted to feed said film to a lower film magazine, means for threading a film over said sprockets and forming upper, lower and intermediate loops to permit variations in speed of travel and resilient means for driving said sound sprocket whereby slight variations in driving torque are prevented from affecting the rate of travel of said film over said sound aperture.

5. In a machine of the class described, a projection head having a sound aperture and a picture aperture, a picture film gate associated with said picture aperture, means for adjusting said gate in a direction parallel to itself for securing or releasing a film, a sound film gate comprising a pair of pivoted members and a slidable member and a single means for operating said pivoted members and said sliding member for controlling the pressure on said film, driving elements near each gate for moving a continuous film in front of said gates, and power means for driving said elements in synchronized speed relation to each other to permit said film to be moved through said projection head without injury.

6. In a projection machine, a picture aperture plate and a sound aperture plate, a sprocket for moving a film in front of said picture aperture plate, an idler sprocket and a continuous sprocket for feeding said film past said sound aperture plate, a sound film gate comprising pivoted members adapted to contact with said sprockets, a slidable member adapted to contact with said sound aperture plate and a single means for releasing all of said members, a power means for driving said sprockets in synchronized speed relation to each other to permit said film to be moved through said projection head without injury.

7. In a projection head, a pair of continuously operated feed sprockets, a continuously operated sound sprocket, an intermittently operated sprocket, a light shutter, a single vertical drive shaft for operating each of said sprockets and said shutter and resilient means interconnecting said shaft with certain of said sprockets whereby to prevent tearing of the film due to irregularities in drive.

8. In a projection head, a picture aperture and a sound aperture, a plurality of vertically aligned sprockets for feeding a film successively past said apertures, and means for driving said sprockets comprising a vertical drive shaft, a pair of shutters and means associated with said drive shaft for operating said shutters in opposite directions, a fire shutter, and a governor operated by said drive shaft for releasing said fire shutter when the speed of said shaft falls below a predetermined value.

9. In a projection head, a picture aperture and a sound aperture, a plurality of vertically aligned sprockets for feeding a film successively past said apertures, means for driving said sprockets comprising a vertical drive shaft, a pair of shutters and means associated with said drive shaft for operating said shutters in opposite directions, a fire shutter, a governor operated by said drive shaft for releasing said fire shutter when the speed of said shaft falls below a predetermined value, means for driving said vertical shaft, and an auxiliary drive wheel associated with one of said sprockets.

10. A drive for a projection machine comprising a vertical shaft extending through the projection head thereof, means for driving the various operating elements of the machine from said shaft, a motor mounted at the lower end of said shaft in axial alignment therewith, a pedestal lever for supporting said projection head and having a downwardly extending flange, and means for mounting said motor on said flange whereby both the motor and the projection head comprise a single mechanical unit.

11. A talking motion picture machine for use in combination with a wide film having a sound aperture and a picture aperture, feed sprockets for passing said film over said apertures, means for forming loops above and below each of said apertures whereby variations in drive are permitted, means for feeding said film to and from a film magazine and means associated with certain of said sprockets for permitting slight angular variation of the axis thereof in response to variation in line of travel of said film whereby tearing of said film is avoided.

12. A talking motion picture machine for use in combination with a wide film having a sound aperture and a picture aperture, feed sprockets for passing said film over said apertures, means for forming loops above and below each of said apertures whereby variations in drive are permitted, means for feeding said film to and from a film magazine and means associated with certain of said sprockets for equalizing the driving torque and preventing variations thereof from being transmitted to the film.

LOUIS S. FRAPPIER.
EWALD BOECKING.